United States Patent
Dettinger et al.

(10) Patent No.: US 8,140,595 B2
(45) Date of Patent: Mar. 20, 2012

(54) LINKED LOGICAL FIELDS

(75) Inventors: Richard D. Dettinger, Rochester, MN (US); Thomas J. Eggebraaten, Rochester, MN (US); Jeffrey W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 12/038,885

(22) Filed: Feb. 28, 2008

(65) Prior Publication Data

US 2008/0162446 A1 Jul. 3, 2008

Related U.S. Application Data

(62) Division of application No. 10/857,746, filed on May 28, 2004.

(51) Int. Cl.
*G06F 17/00* (2006.01)
(52) U.S. Cl. ........ 707/809; 707/810; 707/772; 707/791; 707/822
(58) Field of Classification Search .................. 707/809, 707/810, 772, 791, 822
See application file for complete search history.

(56) References Cited

U.S. PATENT DOCUMENTS

| | | | | |
|---|---|---|---|---|
| 6,996,558 | B2 * | 2/2006 | Dettinger et al. | 1/1 |
| 7,146,376 | B2 * | 12/2006 | Dettinger et al. | 707/809 |
| 2004/0139070 | A1 | 7/2004 | Dysart et al. | |
| 2004/0193952 | A1 * | 9/2004 | Narayanan et al. | 714/13 |
| 2005/0027507 | A1 * | 2/2005 | Patrudu | 704/1 |
| 2005/0091198 | A1 | 4/2005 | Dettinger et al. | |
| 2005/0228800 | A1 * | 10/2005 | Dettinger et al. | 707/100 |
| 2005/0278306 | A1 | 12/2005 | Dettinger et al. | |
| 2006/0085437 | A1 * | 4/2006 | Brodhun et al. | 707/100 |

OTHER PUBLICATIONS

Office Action for U.S. Appl. No. 10/857,746, Dated Feb. 12, 2007.
Office Action for U.S. Appl. No. 10/857,746, Dated Jun. 28, 2007.
Final Office Action for U.S. Appl. No. 10/857,746, Dated Dec. 12, 2007.

* cited by examiner

*Primary Examiner* — Sana Al Hashemi
(74) *Attorney, Agent, or Firm* — Patterson & Sheridan L.L.P.

(57) ABSTRACT

A method, system and article of manufacture for linking logical fields abstractly describing data in a database and, more particularly, for creating an abstract query using linked logical fields. One embodiment provides a method of linking logical fields abstractly describing data in a database. The method includes creating link information for a first logical field from the plurality of logical fields. The link information identifies at least one second logical field from the plurality of logical fields and an associated link type operation. The first and second logical fields are linked using the link information.

9 Claims, 9 Drawing Sheets

| | f_name | l_name |
|---|---|---|
| 1 | ... | ... |
| 2 | ... | ... |
| ⋮ | | |
| N | ... | ... |

*FIG. 8B*

| | f_name | l_name | street | age/10 |
|---|---|---|---|---|
| 1 | ... | ... | ... | ... |
| 2 | ... | ... | ... | ... |
| ⋮ | | | | |
| N | ... | ... | ... | ... |

☐ EXPAND TABLE

*FIG. 8C*

| | f_name | l_name | street | age | age/10 |
|---|---|---|---|---|---|
| 1 | ... | ... | ... | ... | ... |
| 2 | ... | ... | ... | ... | ... |
| ⋮ | | | | | |
| N | ... | ... | ... | ... | ... |

☒ EXPAND TABLE

LINKED LOGICAL FIELDS

CROSS-REFERENCE TO RELATED APPLICATIONS

This application is a divisional of co-pending U.S. patent application Ser. No. 10/857,746, filed May 28, 2004, which is hereby incorporated by reference in its entirety.

BACKGROUND OF THE INVENTION

1. Field of the Invention

The present invention generally relates to data processing and, more particularly, to creating queries using linked result fields.

2. Description of the Related Art

Databases are computerized information storage and retrieval systems. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a DBMS can be structured to support a variety of different types of operations for a requesting entity (e.g., an application, the operating system or an end user). Such operations can be configured to retrieve, add, modify and delete information being stored and managed by the DBMS. Standard database access methods support these operations using high-level query languages, such as the Structured Query Language (SQL). The term "query" denominates a set of commands that cause execution of operations for processing data from a stored database. For instance, SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database.

Queries may include both an explicit specification of result fields for which data is to be returned upon execution of the queries, and criteria used for selection of the data. The data selection criteria are generally represented as query conditions that serve to filter the data returned for the result fields upon execution of the query. Accordingly, a query may be thought of as group of filters put together to sift out only the result field data in which they are interested.

Result fields of queries can be linked to each other such that analysis of information obtained for a given result field requires analysis of information obtained for corresponding linked result fields in order to determine a meaningful analysis result. For instance, assume a quality control environment where a specific quality control consists of a multiplicity of individual tests performed on corresponding objects. Each result obtained for an individual test can be described by an associated quality control field. All associated quality control fields are linked to each other as they all relate to the specific quality control. Assume now a user who wants to verify whether the specific quality control has been performed for a given object and whether the result of the quality control was acceptable. Therefore, the user may create a query to retrieve the results of all individual tests performed on the given object. To create the query, the user manually includes all associated quality control fields as result fields with the query. However, if the number of associated quality control fields is large, this process is cumbersome and time-consuming.

Therefore, there is a need for an efficient technique for creating queries including linked result fields.

SUMMARY OF THE INVENTION

The present invention is generally directed to a method, system and article of manufacture for linking logical fields abstractly describing data in a database and, more particularly, for creating an abstract query using linked logical fields.

One embodiment provides a method of linking logical fields abstractly describing data in a database. The method includes creating link information for a first logical field from the plurality of logical fields. The link information identifies at least one second logical field from the plurality of logical fields and an associated link type operation. The first and second logical fields are linked using the link information.

Another embodiment provides a method of creating an abstract query. The method includes receiving user input selecting, as result field for the abstract query, at least one logical field from a plurality of logical fields abstractly describing data in a database. Then, it is determined whether the at least one selected logical field includes link information. The link information defines one or more linked logical fields from the plurality of logical fields and associated link type operations. If the at least one selected logical field includes link information, the abstract query is generated on the basis of the at least one selected logical field, the one or more linked logical fields and the link information.

Still another embodiment provides a computer-readable medium containing a program which, when executed by a processor, performs a process of creating an abstract query. The process includes receiving user input selecting, as result field for the abstract query, at least one logical field from a plurality of logical fields abstractly describing data in a database. Then, it is determined whether the at least one selected logical field includes link information defining one or more linked logical fields from the plurality of logical fields and associated link type operations. If the at least one selected logical field includes link information, the abstract query is generated on the basis of the at least one selected logical field, the one or more linked logical fields and the link information.

Still another embodiment provides a system, including a plurality of logical fields and a link field manager. The plurality of logical fields abstractly describes data in a database. The link field manager is configured to create link information for a first logical field from the plurality of logical fields. The link information identifies at least one second logical field from the plurality of logical fields and an associated link type operation. The link field manager is further configured to link the first and second logical fields using the link information.

Yet another embodiment provides a system including a plurality of logical fields, a user interface and a link field manager. The plurality of logical fields abstractly describes data in a database. The user interface is configured to receive user input selecting, as result field for an abstract query, at least one logical field from the plurality of logical fields. The link field manager is configured to determine whether the at least one selected logical field includes link information. The link information defines one or more linked logical fields from the plurality of logical fields and associated link type operations. The link field manager is further configured to generate, if the at least one selected logical field includes the link information, the abstract query on the basis of the at least one selected logical field, the one or more linked logical fields and the link information.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

The present invention generally is directed to a system, method and article of manufacture for linking logical fields and for creating abstract queries using linked logical fields. According to one aspect, a logical field provides a logical representation of a specific set of data in a database. All the data in the database is abstractly described by a data abstraction model. The data abstraction model includes a plurality of logical field specifications. A logical field specification is provided for each logical field and describes the logical representation of the specific set of the data for the logical field.

In one embodiment, logical fields are linked. To this end, a first logical field from a plurality of logical fields defining a corresponding data abstraction model is selected. Then, at least one second logical field that is linked to the first logical field is identified from the plurality of logical fields. In order to describe the link between the first logical field and the at least one second logical field, link information is created. In one embodiment, the link information is created for the first logical field. Accordingly, the link information identifies the at least one second logical field and an associated link type operation. The link type operation defines an operation to be performed on the at least one second logical field in response to selection of the first logical field as result field for an abstract query. Using the link information, the first and second logical fields can be linked.

In one embodiment, an abstract query is created. As result field(s) for the abstract query, at least one logical field from a plurality of logical fields defining a corresponding data abstraction model is selected. The at least one selected logical field is parsed to determine whether link information is included therewith. If the at least one selected logical field includes link information, corresponding linked logical field (s) and associated link type operation(s) are determined from the link information. The abstract query is then generated on the basis of the at least one selected logical field and the corresponding linked logical field(s) according to the associated link type operation(s). The abstract query can be transformed into a concrete query that can be executed against one or more databases. The transformation is performed using the corresponding data abstraction model. Upon execution of the concrete query against the one or more databases, data is returned for each result field.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, computer system 110 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Computing Environment

Figure 1:
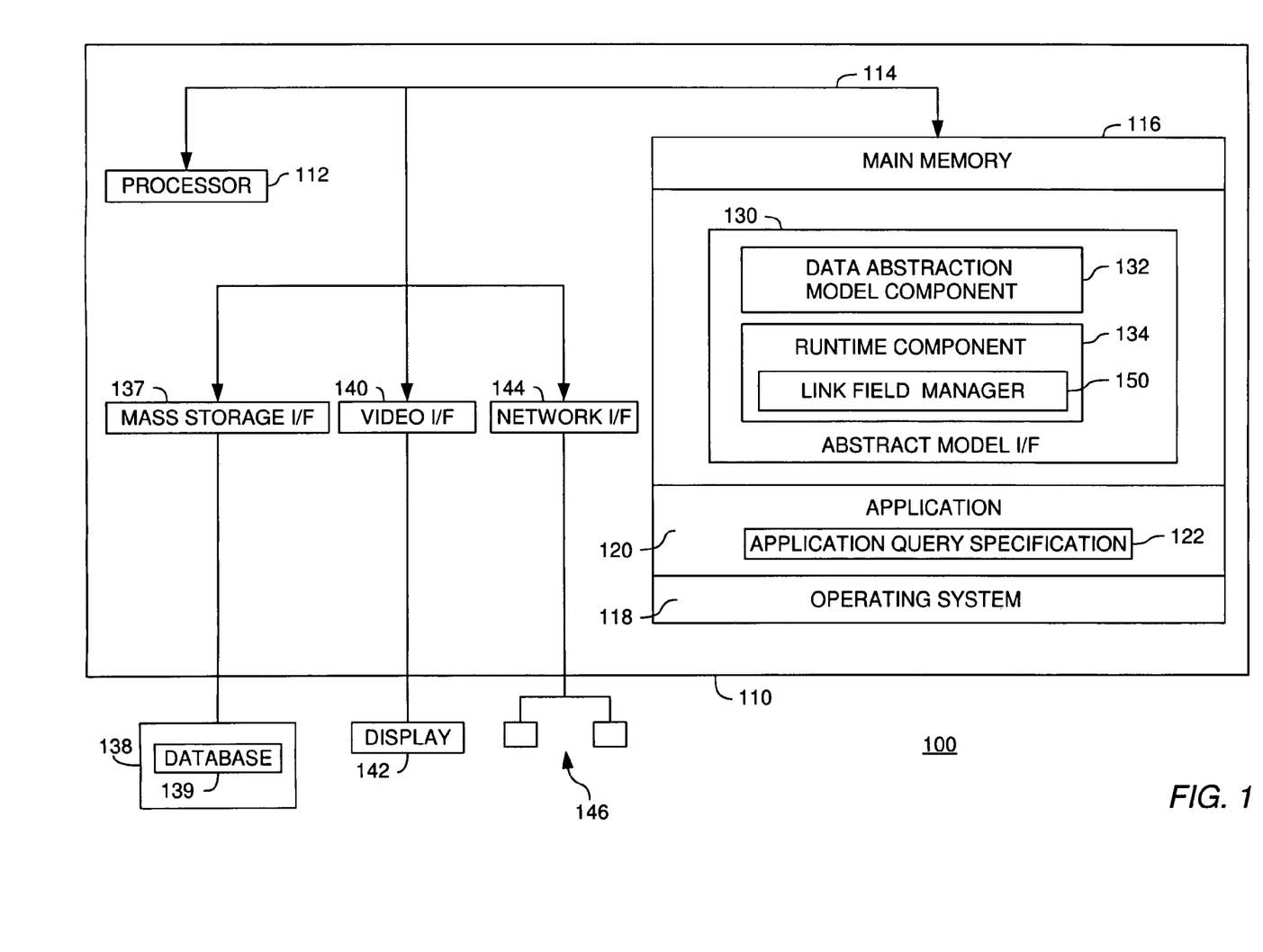
FIG. 1 is a computer system illustratively utilized in accordance with the invention.

Referring now to FIG. 1, a computing environment 100 is shown. In general, the distributed environment 100 includes computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer computer available from International Business Machines of Armonk, N.Y.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 110 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention. The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer system 110 via bus 114.

The memory 116 is shown configured with an operating system 118. The operating system 118 is the software used for managing the operation of the computer system 110. Examples of the operating system 118 include IBM OS/400®, UNIX, Microsoft Windows®, and the like.

Figure 2:
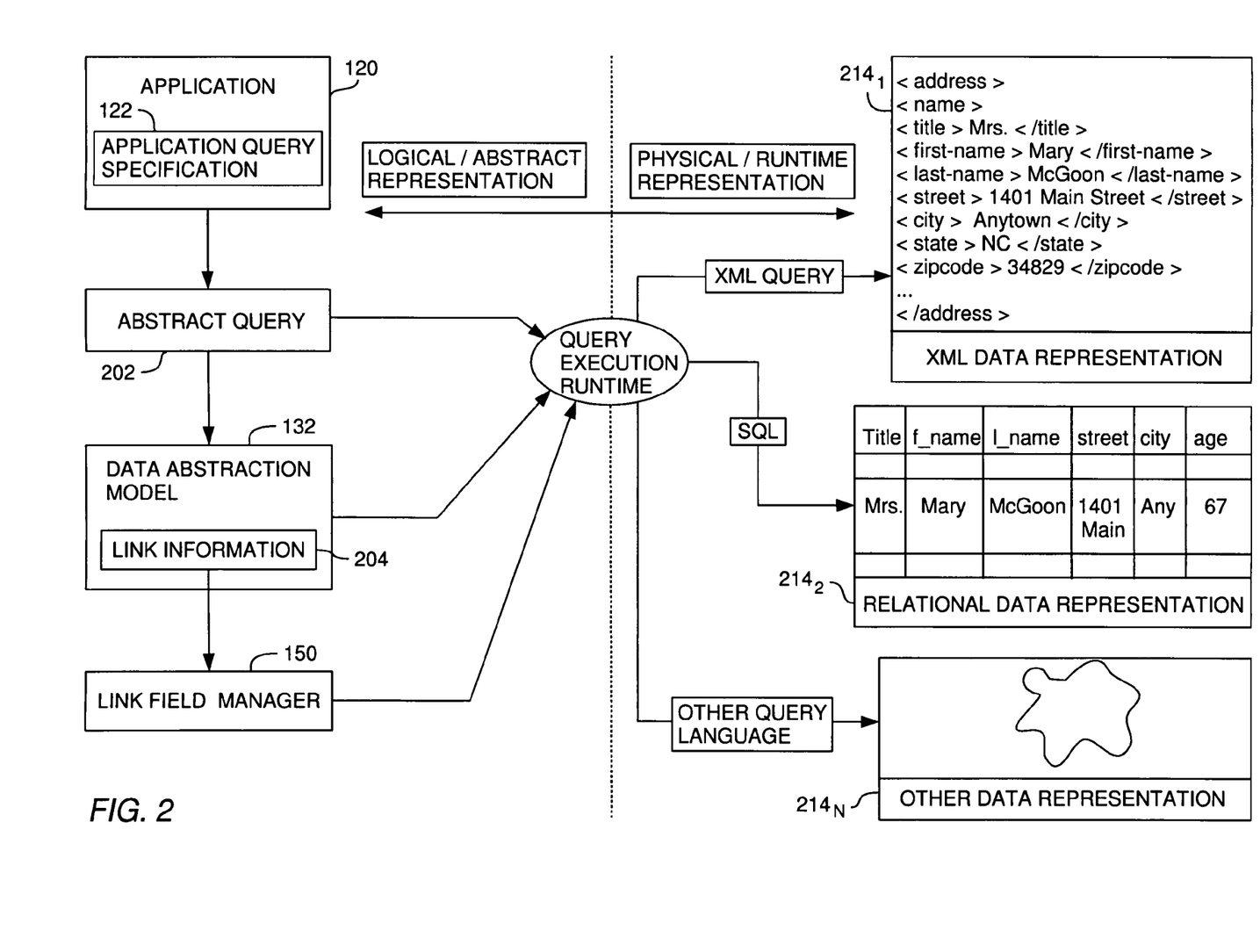
FIGS. 2-3 are relational views of software components for abstract query management.

The memory 116 further includes one or more applications 120 and an abstract model interface 130. The applications 120 and the abstract model interface 130 are software products comprising a plurality of instructions that are resident at various times in various memory and storage devices in the computer system 110. When read and executed by one or more processors 112 in the computer system 110, the applications 120 and the abstract model interface 130 cause the computer system 110 to perform the steps necessary to execute steps or elements embodying the various aspects of the invention. The applications 120 (and more generally, any requesting entity, including the operating system 118) are configured to issue queries against a database 139 (shown in storage 138). The database 139 is representative of any collection of data regardless of the particular physical representation of the data. A physical representation of data defines an organizational schema of the data. By way of illustration, the database 139 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

The queries issued by the applications 120 are defined according to an application query specification 122 included with each application 120. The queries issued by the applications 120 may be predefined (i.e., hard coded as part of the applications 120) or may be generated in response to input (e.g., user input). In either case, the queries (referred to herein as "abstract queries") are composed using logical fields defined by the abstract model interface 130. A logical field defines an abstract view of data whether as an individual data item or a data structure in the form of, for example, a database table. In particular, the logical fields used in the abstract queries are defined by a data abstraction model component 132 of the abstract model interface 130. In one embodiment, the data abstraction model component 132 includes link information that is created and managed by a link field manager 150. The link information describes links between different logical fields and can be used for creating the abstract queries. Operation and interaction of the data abstraction model 132 and the link field manager 150 are further described below with reference to FIGS. 2-3.

Illustratively, the link field manager 150 is shown as part of a runtime component 134. The runtime component 134 transforms the abstract queries into concrete queries having a form consistent with the physical representation of the data contained in the database 139. The concrete queries can be executed by the runtime component 134 against the database 139. Operation of the runtime component 134 is further described below with reference to FIG. 2.

An Exemplary Query Execution Runtime Environment

Referring now to FIG. 2, a relational view illustrating interaction of the runtime component 134, the application 120, the data abstraction model 132 and the link field manager 150 at query execution runtime is shown. The data abstraction model 132 is also referred to herein as a "logical representation" because the data abstraction model 132 defines logical fields corresponding to data structures in a database (e.g., database 139), thereby providing an abstract, i.e., a logical view of the data in the database. A data structure is a physical arrangement of the data, such as an arrangement in the form of a database table or a column of the database table. In a relational database environment having a multiplicity of database tables, a specific logical representation having specific logical fields can be provided for each database table. In this case, all specific logical representations together constitute the data abstraction model 132. Physical entities of the data are arranged in the database 139 according to a physical representation of the data. A physical entity of data (interchangeably referred to as a physical data entity) is a data item in an underlying physical representation. Accordingly, a physical data entity is the data included in a database table or in a column of the database table, i.e., the data itself. By way of illustration, two physical representations are shown, an XML data representation $214_1$ and a relational data representation $214_2$. However, the physical representation $214_N$ indicates that any other physical representation, known or unknown, is contemplated. In one embodiment, a different single data abstraction model 132 is provided for each separate physical representation 214, as explained above for the case of a relational database environment. In an alternative embodiment, a single data abstraction model 132 contains field specifications (with associated access methods) for two or more physical representations 214. A field specification is a description of a logical field and generally comprises a mapping rule that maps the logical field to a data structure(s) of a particular physical representation.

Figure 3A:
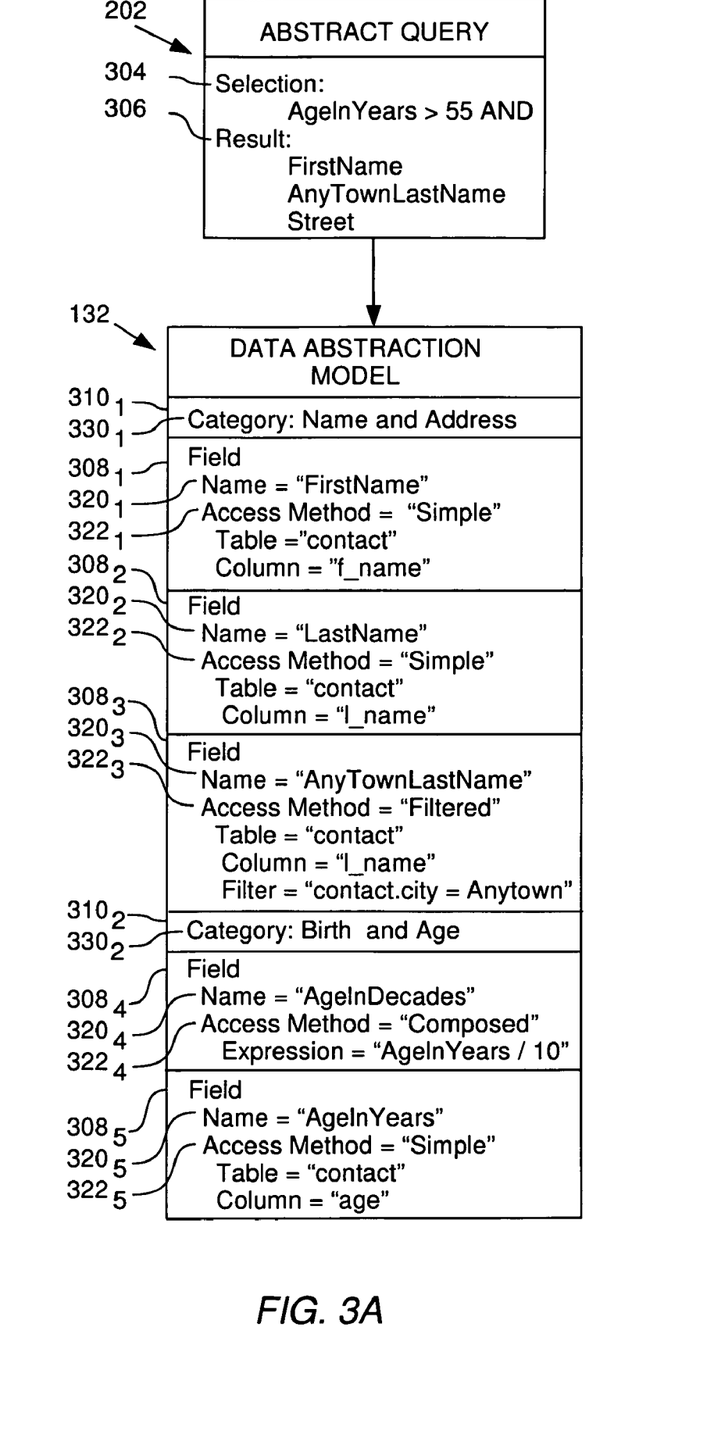

Using a logical representation of the data, the application query specification 122 specifies one or more logical fields to compose a resulting query 202. Each of the one or more logical fields can be linked to one or more other logical fields. A requesting entity (e.g., the application 120) issues the resulting query 202 as defined by an application query specification of the requesting entity. In one embodiment, the abstract query 202 may include both criteria used for data selection and an explicit specification of result fields to be returned based on the data selection criteria. An example of the selection criteria and the result field specification of the abstract query 202 is shown in FIG. 3A. Accordingly, the abstract query 202 illustratively includes selection criteria 304 and a result field specification 306.

The resulting query 202 is generally referred to herein as an "abstract query" because the query is composed according to abstract (i.e., logical) fields rather than by direct reference to the underlying data structures in the database 139. As a result, abstract queries may be defined that are independent of the particular underlying physical data representation used. For execution, the abstract query is transformed into a concrete query consistent with the underlying physical representation of the data using the data abstraction model 132. The concrete query is executable against the database 139. An exemplary method for transforming the abstract query into a concrete query is described below with reference to FIGS. 4-5.

In general, the data abstraction model 132 exposes information as a set of logical fields that may be used within an abstract query to specify criteria for data selection and specify the form of result data returned from a query operation. The logical fields are defined independently of the underlying physical representation being used in the database 139, thereby allowing abstract queries to be formed that are loosely coupled to the underlying physical representation.

Illustratively, the data abstraction model 132 includes link information 204. The link information 204 describes links between different logical fields of the data abstraction model 132. If more than one data abstraction model is provided, the link information 204 may describe links between logical fields of different data abstraction models. Using the link field manager 150, the link information 204 can be accessed for identifying linked logical fields. More specifically, for each logical field that is selected as result field for the abstract query 202, the link field manager 150 can determine linked logical fields from the link information 204. The link field manager 150 can further determine an associated link type operation for each determined linked logical field from the link information 204. On the basis of the determined link type operations, the link field manager 150 can automatically modify the abstract query 202 with respect to the determined linked logical fields.

An Exemplary Data Abstraction Model

Referring now to FIG. 3A, a relational view illustrating interaction of the abstract query 202 and the data abstraction model 132 is shown. In one embodiment, the data abstraction model 132 comprises a plurality of field specifications $308_1$, $308_2$, $308_3$, $308_4$ and $308_5$ (five shown by way of example), collectively referred to as the field specifications 308. Specifically, a field specification is provided for each logical field available for composition of an abstract query. Each field specification may contain one or more attributes. Illustratively, the field specifications 308 include a logical field name attribute $320_1$, $320_2$, $320_3$, $320_4$, $320_5$ (collectively, field name 320) and an associated access method attribute $322_1$, $322_2$, $322_3$, $322_4$, $322_5$ (collectively, access methods 322). Each attribute may have a value. For example, logical field name attribute $320_1$ has the value "FirstName" and access method attribute $322_1$ has the value "Simple". Furthermore, each attribute may include one or more associated abstract properties. Each abstract property describes a characteristic of a data structure and has an associated value. As indicated above, a data structure refers to a part of the underlying physical representation that is defined by one or more physical entities of the data corresponding to the logical field. In particular, an abstract property may represent data location metadata abstractly describing a location of a physical data entity corresponding to the data structure, like a name of a database table or a name of a column in a database table. Illustratively, the access method attribute $322_1$ includes data location metadata "Table" and "Column". Furthermore, data location metadata "Table" has the value "contact" and data location metadata "Column" has the value "f_name". Accordingly, assuming an underlying relational database schema in the present example, the values of data location metadata "Table" and "Column" point to a table "contact" having a column "f_name".

In one embodiment, groups (i.e. two or more) of logical fields may be part of categories. Accordingly, the data abstraction model 132 includes a plurality of category specifications $310_1$ and $310_2$ (two shown by way of example), collectively referred to as the category specifications. In one embodiment, a category specification is provided for each logical grouping of two or more logical fields. For example, logical fields $308_{1-3}$ and $308_{4-5}$ are part of the category specifications $310_1$ and $310_2$, respectively. A category specification is also referred to herein simply as a "category". The categories are distinguished according to a category name, e.g., category names 330, and 3302 (collectively, category name (s) 330). In the present illustration, the logical fields $308_{1-3}$ are part of the "Name and Address" category and logical fields $308_{4-5}$ are part of the "Birth and Age" category.

The access methods 322 generally associate (i.e., map) the logical field names to data in the database (e.g., database 139 of FIG. 1). Any number of access methods is contemplated depending upon the number of different types of logical fields to be supported. In one embodiment, access methods for simple fields, filtered fields and composed fields are provided. The field specifications $308_1$, $308_2$ and $308_5$ exemplify simple field access methods $322_1$, $322_2$, and $322_5$, respectively. Simple fields are mapped directly to a particular data structure in the underlying physical representation (e.g., a field mapped to a given database table and column). By way of illustration, as described above, the simple field access method $322_1$ maps the logical field name $320_1$ ("FirstName") to a column named "f_name" in a table named "contact". The field specification $308_3$ exemplifies a filtered field access method $322_3$. Filtered fields identify an associated data structure and provide filters used to define a particular subset of items within the physical representation. An example is provided in FIG. 3A in which the filtered field access method $322_3$ maps the logical field name $320_3$ ("AnyTownLast- Name") to data in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $308_4$ exemplifies a composed field access method $322_4$. Composed access methods compute a logical field from one or more data structures using an expression supplied as part of the access method definition. In this way, information which does not exist in the underlying physical data representation may be computed. In the example illustrated in FIG. 3A the composed field access method $322_4$ maps the logical field name $320_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 308 include a type attribute which reflects the format of the underlying data. However, in another embodiment, the data format of the field specifications 308 is different from the associated underlying physical data, in which case a conversion of the underlying physical data into the format of the logical field is required.

By way of example, the field specifications 308 of the data abstraction model 132 shown in FIG. 3A are representative of logical fields mapped to data represented in the relational data representation $214_2$ shown in FIG. 2. However, other instances of the data abstraction model 132 map logical fields to other physical representations, such as XML.

An illustrative abstract query corresponding to the abstract query 202 shown in FIG. 3A is shown in Table I below. By way of illustration, the illustrative abstract query is defined using XML. However, any other language may be used to advantage.

TABLE I

ABSTRACT QUERY EXAMPLE

```
001  <?xml version="1.0"?>
002  <!--Query string representation: (AgeInYears > "55"-->
003  <QueryAbstraction>
004      <Selection>
005          <Condition internalID="4">
006          <Condition field="AgeInYears" operator="GT"
                 value="55"
007                  internalID="1"/>
008      </Selection>
009      <Results>
010          <Field name="FirstName"/>
011          <Field name="AnyTownLastName"/>
012      </Results>
013  </QueryAbstraction>
```

Illustratively, the abstract query shown in Table I includes a selection specification (lines 004-008) containing selection criteria and a result specification (lines 009-012). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative data abstraction model (DAM) corresponding to the data abstraction model 132 shown in FIG. 3A is shown in Table II below. By way of illustration, the illustrative data abstraction model is defined using XML. However, any other language may be used to advantage.

TABLE II

DATA ABSTRACTION MODEL EXAMPLE

```
001  <?xml version="1.0"?>
002  <DataAbstraction>
003      <Category name="Name and Address">
004          <Field queryable="Yes" name="FirstName"
                 displayable="Yes">
005              <AccessMethod>
006                  <Simple columnName="f_name"
                         tableName="contact"></Simple>
007              </AccessMethod>
008          </Field>
009          <Field queryable="Yes" name="LastName"
                 displayable="Yes">
010              <AccessMethod>
011                  <Simple columnName="l_name"
                         tableName="contact"></Simple>
012              </AccessMethod>
013          </Field>
014          <Field queryable="Yes" name="AnyTownLastName"
                 displayable="Yes">
015              <AccessMethod>
016                  <Filter columnName="l_name"
                         tableName="contact">
017                  </Filter="contact.city=Anytown">
018              </AccessMethod>
019          </Field>
020      </Category>
021      <Category name="Birth and Age">
022          <Field queryable="Yes" name="AgeInDecades"
                 displayable="Yes">
023              <AccessMethod>
024                  <Composed columnName="age"
                         tableName="contact">
025                  </Composed
                         Expression="columnName/10">
026              </AccessMethod>
027          </Field>
028          <Field queryable="Yes" name="AgeInYears"
                 displayable="Yes">
029              <AccessMethod>
030                  <Simple columnName="age"
                         tableName="contact"></Simple>
031              </AccessMethod>
032          </Field>
033      </Category>
034  </DataAbstraction>
```

By way of example, note that lines 004-008 correspond to the first field specification $308_1$ of the DAM 132 shown in FIG. 3A and lines 009-013 correspond to the second field specification $308_2$.

According to one aspect, the data abstraction model 132 may include link information (e.g., link information 204 of FIG. 2). The link information may be used to identify a set of fields that are "linked" by some common attribute, category, or merely the fact that users interested in one of the fields are often interested in the others.

Further, as previously described in the Background Section with respect to a quality control environment, result fields of queries can be linked to each other such that analysis of information obtained for one result field requires analysis of information obtained for one or more other corresponding linked result fields, such as individual test results, in order to determine a meaningful analysis result. According to aspects of the present invention, rather than manually include all associated quality control fields as result fields within a query, a user may be able to specify a single linked field, which may facilitate the query building process, particularly as the number of linked fields grows.

For some embodiments, each of the field specifications 308 of the data abstraction model 132 may include associated link information defining linked logical fields and associated link type operations. An exemplary field specification including link information is described below with reference to FIG. 3B.

Link Field Information

Figure 3B:
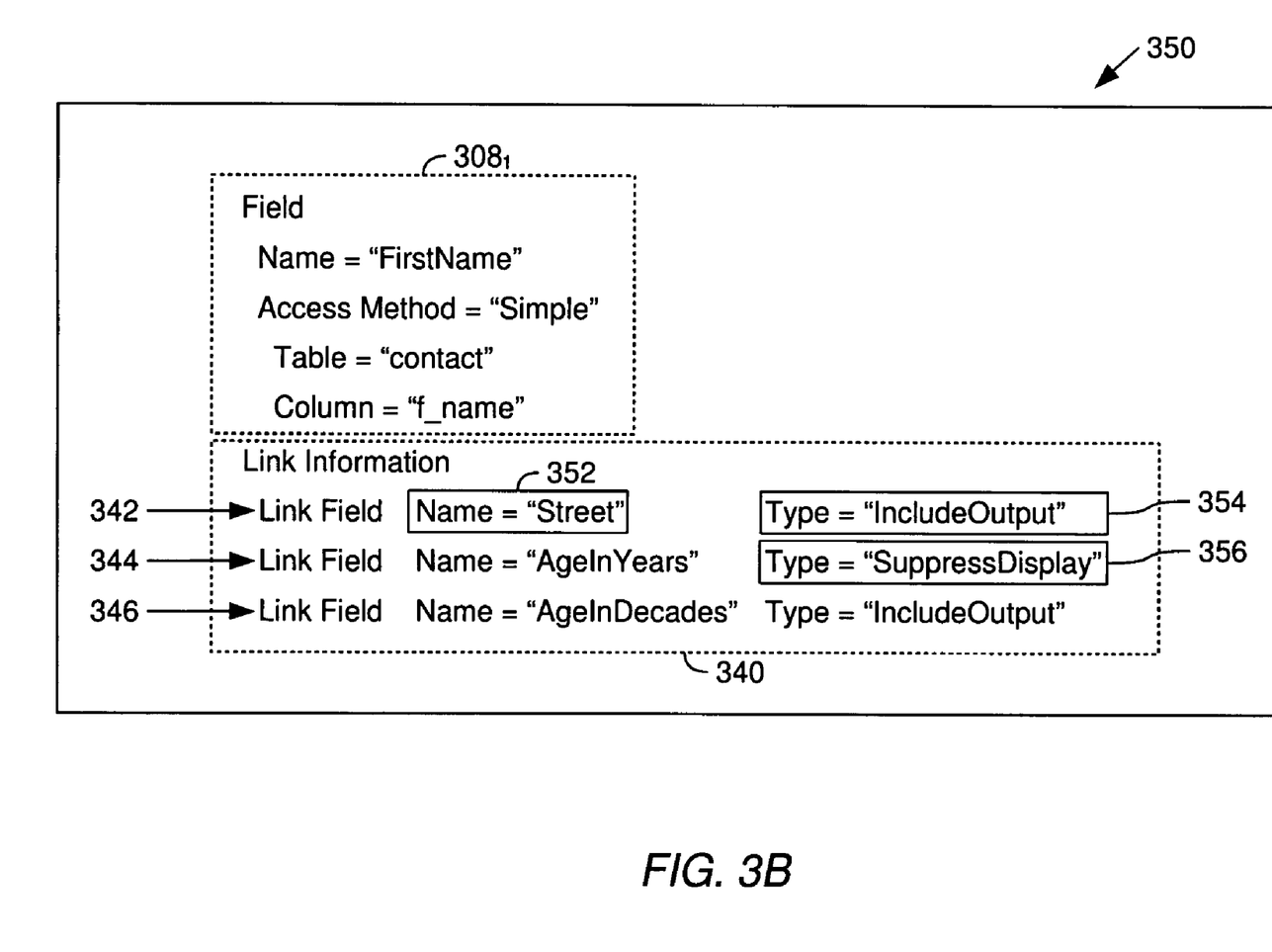

Referring now to FIG. 3B, one embodiment of a field specification 350 containing link information 340 is illustrated. By way of example, the link information 340 has been added to the field specification $308_1$ of FIG. 3A to form the field specification 350.

Illustratively, the link information 340 contains three link field definitions 342, 344 and 346. Each link field definition identifies a linked logical field and an associated link type operation. Specifically, each link field definition may contain one or more attributes. Each attribute may have a value. In one embodiment, each link field definition includes a link field name attribute and a link type operation attribute. For instance, the link field definition 342 includes a link field name attribute "Name" 352 having a value "Street" and a link type operation attribute "Type" 354 having a value "IncludeOutput". The link field definition 344 illustratively includes a link type operation attribute "Type" 356 having a value "SuppressDisplay".

Each link type operation in one of the link definitions 342, 344 and 346 defines an operation to be performed on the associated linked logical field when the logical field $308_1$ "FirstName" has been selected as a result field for a corresponding abstract query. In one embodiment, the "IncludeOutput" operation is used for inserting the associated linked logical field as result field into the corresponding abstract query. The "SuppressDisplay" operation is used for inserting the associated linked logical field as a result field into the corresponding abstract query while suppressing display of data obtained with a query result for the associated linked logical field. However, it should be noted that the "IncludeOutput" and "SuppressDisplay" operations have merely been illustrated by way of example and that various other link type operations are contemplated. For instance, a "SuppressOutput" operation can be implemented for completely suppressing an associated linked logical field as a result field from the corresponding abstract query.

An illustrative data abstraction model (DAM) corresponding to the data abstraction model 132 shown in FIG. 3A including the field specification 350 of FIG. 3B instead of the field specification $308_1$ is shown in Table III below. By way of illustration, the illustrative data abstraction model is defined using XML. However, any other language may be used to advantage.

TABLE III

DATA ABSTRACTION MODEL EXAMPLE

```
001    <?xml version="1.0"?>
002    <DataAbstraction>
003        <Category name="Name and Address">
004            <Field queryable="Yes" name="FirstName"
                   displayable="Yes">
005                <AccessMethod>
006                    <Simple columnName="f_name"
                           tableName="contact"></Simple>
007                </AccessMethod>
008                <Links>
009                    </LinkField name="data://DAM2/Street"
                           type="IncludeOutput" />
010                    </LinkField name="AgeInYears"
                           type="SuppressDisplay" />
```

TABLE III-continued

DATA ABSTRACTION MODEL EXAMPLE

```
011                    </LinkField name="AgeInDecades"
                           type="IncludeOutput" />
012                </Links>
013            </Field>
014            <Field queryable="Yes" name="LastName"
                   displayable="Yes">
015                <AccessMethod>
016                    <Simple columnName="l_name"
                           tableName="contact"></Simple>
017                </AccessMethod>
018            </Field>
019            <Field queryable="Yes" name="AnyTownLastName"
                   displayable="Yes">
020                <AccessMethod>
021                    <Filter columnName="l_name"
                           tableName="contact">
022                    </Filter="contact.city=Anytown">
023                </AccessMethod>
024            </Field>
025        </Category>
026        <Category name="Birth and Age">
027            <Field queryable="Yes" name="AgeInDecades"
                   displayable="Yes">
028                <AccessMethod>
029                    <Composed columnName="age"
                           tableName="contact">
030                    </Composed
                           Expression="columnName/10">
031                </AccessMethod>
032            </Field>
033            <Field queryable="Yes" name="AgeInYears"
                   displayable="Yes">
034                <AccessMethod>
035                    <Simple columnName="age"
                           tableName="contact"></Simple>
036                </AccessMethod>
037            </Field>
038        </Category>
039    </DataAbstraction>
```

By way of example, note that lines 004-013 correspond to the field specification 350 shown in FIG. 3B and that lines 008-012 correspond to the link information 340. Furthermore, it should be noted that the linked logical field "Street" identified in line 009 is not contained in the illustrative data abstraction model of Table III. For purposes of illustration, it is assumed that the "Street" field is contained in another data abstraction model "DAM2" (not shown). Therefore, the link field name attribute "name" in line 009 defines by way of example a path to the "Street" field in the data abstraction model "DAM2", i.e., "data://DAM2/Street".

Using the illustrative data abstraction model of Table III, the illustrative abstract query shown in Table I can be modified as illustrated in Table IV below. By way of illustration, the illustrative abstract query of Table IV is defined using XML. However, any other language may be used to advantage.

TABLE IV

MODIFIED ABSTRACT QUERY EXAMPLE

```
001    <?xml version="1.0"?>
002    <!-Query string representation: (AgeInYears > "55"-->
003    <QueryAbstraction>
004        <Selection>
005            <Condition internalID="4">
006                <Condition field="AgeInYears" operator="GT"
                       value="55"
007                    internalID="1"/>
008        </Selection>
009        <Results>
```

TABLE IV-continued

MODIFIED ABSTRACT QUERY EXAMPLE

```
010           <Field name="FirstName"/>
011           <Field name="data://DAM2/Street"
012           <Field name="AgeInYears"
              type="SuppressDisplay"/>
013           <Field name="AgeInDecades"/>
014           <Field name="AnyTownLastName"/>
015        </Results>
016     </QueryAbstraction>
```

Illustratively, the abstract query shown in Table IV includes in lines 011-013 a specification of the linked logical fields according to lines 009-011 of Table III. It should be noted that only the linked logical field "AgeInYears" in line 012 contains a specification of the link type operation such that display of data for this result field can be suppressed upon displaying of an obtained query result. As the linked logical fields "Street" and "AgeInDecades" (lines 011 and 013) have been inserted into the abstract query, specification of the corresponding link type operations can be omitted.

In one embodiment, the logical fields that are linked to a given logical field are only taken into consideration for modifying the abstract query at the time of condition building for the given logical field and are otherwise not considered. For example, a linked logical field having an associated "SuppressOutput" link type operation causes removal of the linked logical field if the linked logical field is included in the abstract query at the time a condition is built for the abstract query. If the linked logical field is later added to the abstract query, the link will have no secondary effect on processing. In other words, the linked logical field would then not be removed from the abstract query.

As was noted above, the abstract query of Table IV can be transformed into a concrete query for query execution. An exemplary method for transforming an abstract query into a concrete query is described below with reference to FIGS. 4-5.

Transforming an Abstract Query into a Concrete Query

Figure 4:
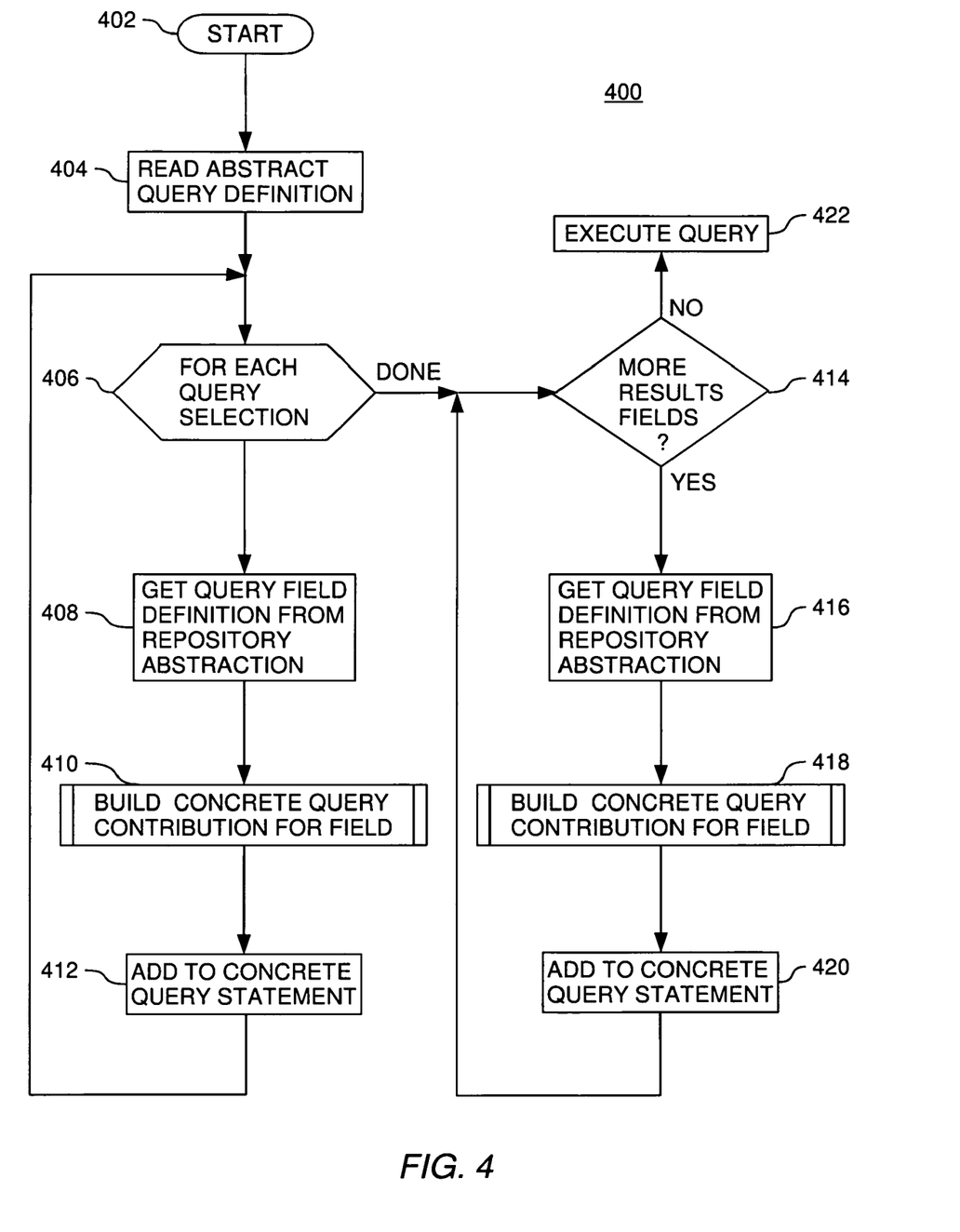
FIGS. 4-5 are flow charts illustrating the operation of a runtime component.

Referring now to FIG. 4, an illustrative runtime method 400 exemplifying one embodiment of the operation of the runtime component 134 of FIG. 1 is shown. The method 400 is entered at step 402 when the runtime component 134 receives as input an abstract query (such as the abstract query shown in Table I or IV). At step 404, the runtime component 134 reads and parses the abstract query and locates individual selection criteria and desired result fields. At step 406, the runtime component 134 enters a loop (comprising steps 406, 408, 410 and 412) for processing each query selection criteria statement present in the abstract query, thereby building a data selection portion of a concrete query. In one embodiment, a selection criterion consists of a field name (for a logical field), a comparison operator (=, >, <, etc) and a value expression (what is the field being compared to). At step 408, the runtime component 134 uses the field name from a selection criterion of the abstract query to look up the definition of the field in the data abstraction model 132. As noted above, the field definition includes a definition of the access method used to access the data structure associated with the field. The runtime component 134 then builds (step 410) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 139 shown in FIG. 1. The concrete query contribution generated for the current field is then added to a concrete query statement. The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the runtime component 134 identifies the information to be returned as a result of query execution. As described above, in one embodiment, the abstract query defines a list of result fields, i.e., a list of logical fields that are to be returned as a result of query execution, referred to herein as a result specification. A result specification in the abstract query may consist of a field name and sort criteria. Accordingly, the method 400 enters a loop at step 414 (defined by steps 414, 416, 418 and 420) to add result field definitions to the concrete query being generated. At step 416, the runtime component 134 looks up a result field name (from the result specification of the abstract query) in the data abstraction model 132 and then retrieves a result field definition from the data abstraction model 132 to identify the physical location of data to be returned for the current logical result field. The runtime component 134 then builds (at step 418) a concrete query contribution (of the concrete query that identifies physical location of data to be returned) for the logical result field. At step 420, the concrete query contribution is then added to the concrete query statement. Once each of the result specifications in the abstract query has been processed, the concrete query is executed at step 422.

Figure 5:
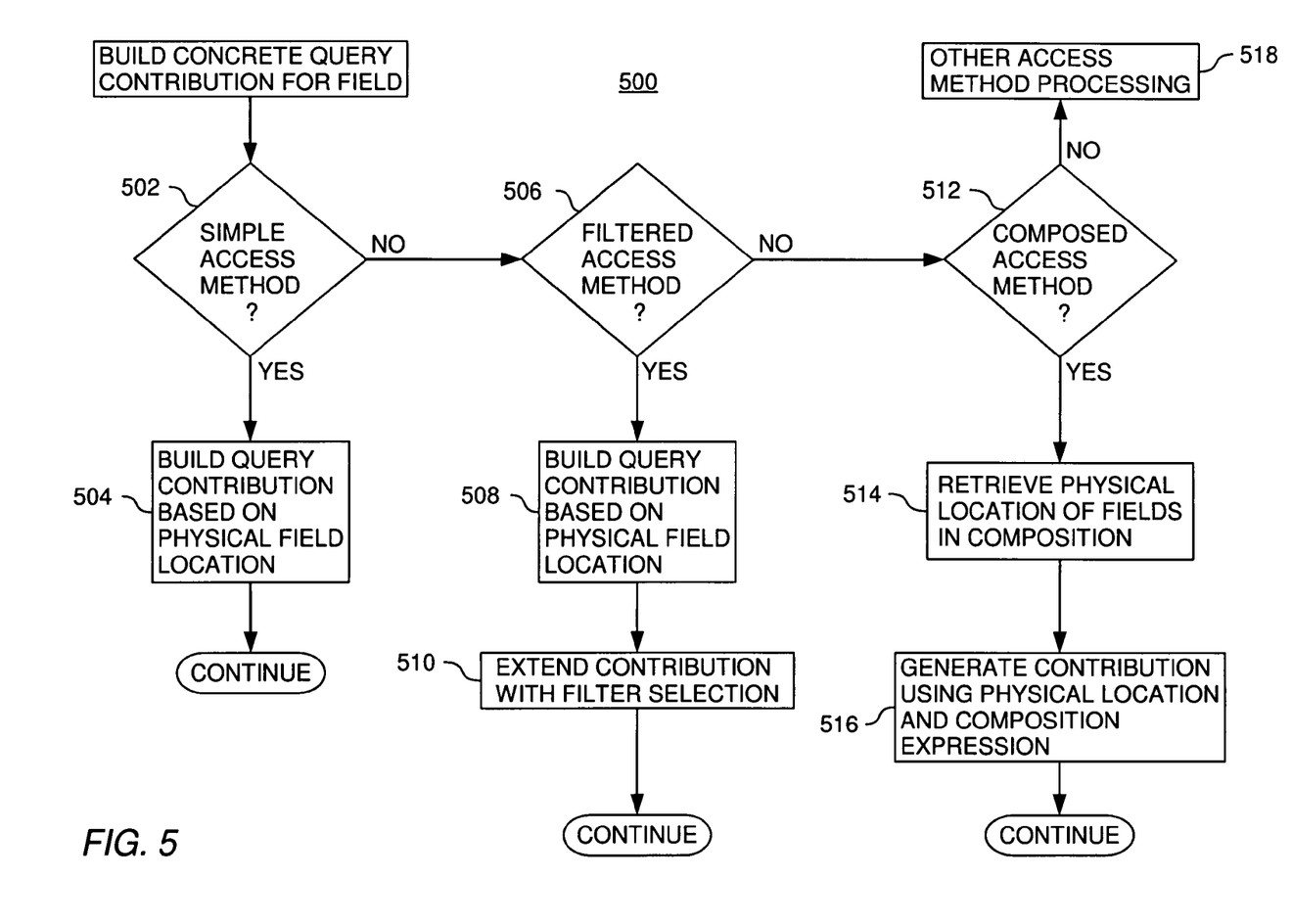

One embodiment of a method 500 for building a concrete query contribution for a logical field according to steps 410 and 418 is described with reference to FIG. 5. At step 502, the method 500 queries whether the access method associated with the current logical field is a simple access method. If so, the concrete query contribution is built (step 504) based on physical data location information and processing then continues according to method 400 described above. Otherwise, processing continues to step 506 to query whether the access method associated with the current logical field is a filtered access method. If so, the concrete query contribution is built (step 508) based on physical data location information for a given data structure(s). At step 510, the concrete query contribution is extended with additional logic (filter selection) used to subset data associated with the given data structure(s). Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the concrete query contribution is generated. Processing then continues according to method 400 described above.

If the access method is not a composed access method, processing proceeds from step 512 to step 518. Step 518 is representative of any other access method types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As was noted above, a data abstraction model may include link information that is created and managed using a link field manager (e.g., link field manager 150 of FIG. 1). The link information is suitable for linking different logical fields and can be used for creating abstract queries. Operation of a link field manager for linking logical fields using link information is described below with reference to FIG. 6.

Linking Logical Fields

Figure 6:
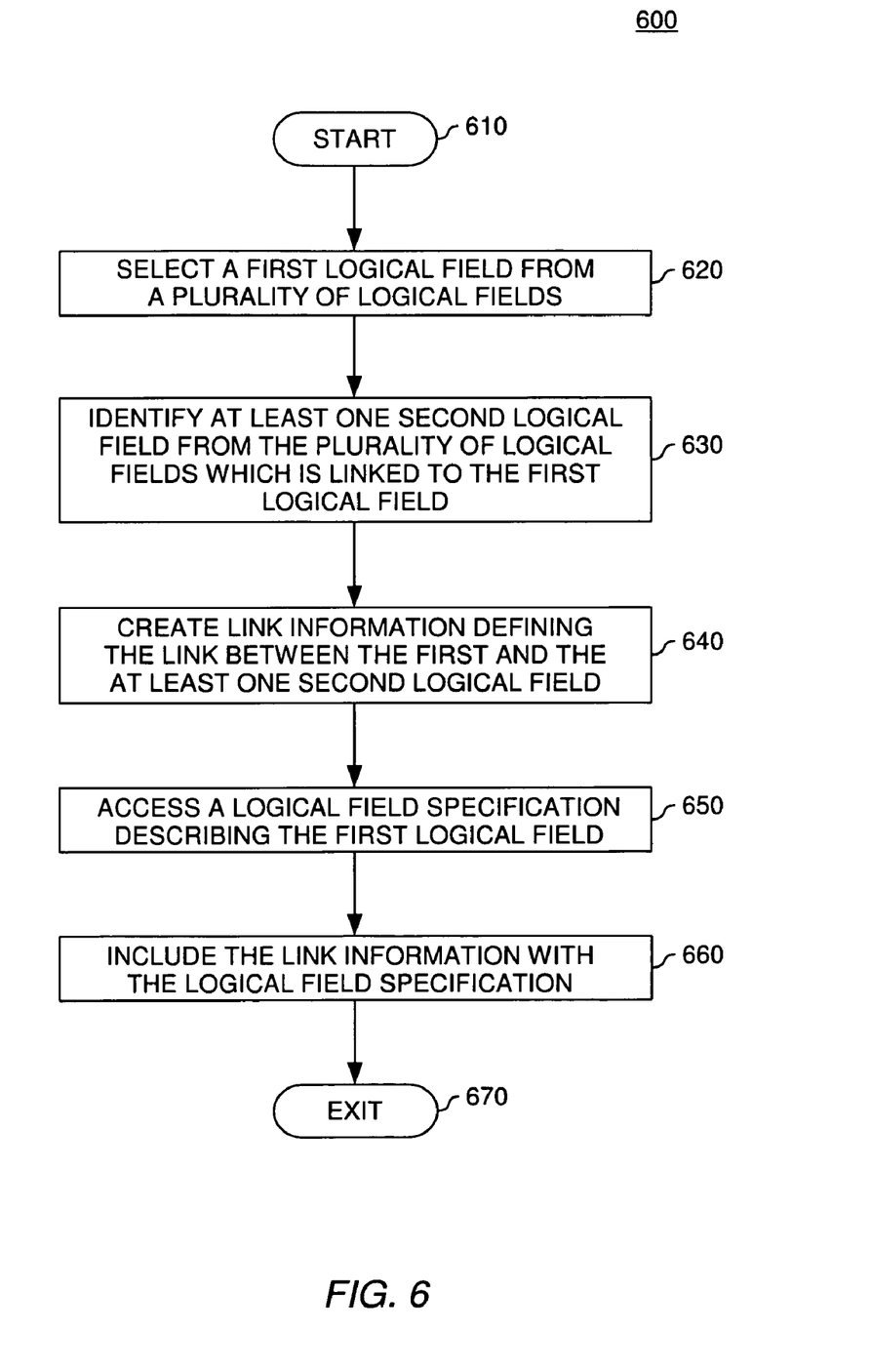
FIG. 6 is a flow chart illustrating linking of logical fields in one embodiment.

Referring now to FIG. 6, an exemplary method 600 for linking logical fields abstractly describing data in a database (e.g., database 139 of FIG. 1) is illustrated. In one embodiment, method 600 is performed by a link field manager (e.g., link field manager 150 of FIG. 1). Method 600 starts at step 610.

At step 620, a first logical field is selected from a plurality of logical fields defining a data abstraction model (e.g., data abstraction model 132 of FIG. 2). In one embodiment, the first logical field is selected in response to user input. At step 630, at least one second logical field that is linked to the first logical field is identified from the plurality of logical fields. In one embodiment, the at least one second logical field is identified in response to user input. Specifically, the user can identify the at least one second logical field on the basis of the user's knowledge of a link between the at least one second logical field and the first logical field. According to one aspect, this knowledge of the user can be based on an identification of one or more groups of linked logical fields from the plurality of logical fields by the user prior to step 620.

At step 640, link information for the first logical field is created. The link information identifies the at least one second logical field and an associated link type operation. The link type operation defines an operation to be performed on the at least one second logical field in response to selection of the first logical field as result field for an abstract query (e.g., abstract query 202 of FIG. 2). By way of example, the link type operation can be an (i) insert, (ii) suppress, or (iii) suppress display operation. In one embodiment, the link information is created by the user.

At step 650, a logical field specification describing the first logical field is identified from the data abstraction model and accessed. At step 660, the link information is included with the logical field specification. In one embodiment, the logical field specification is edited by the user to insert the link information therein, as described above with reference to Table III. Thus, the first and second logical fields are linked using the link information. Method 600 then exits at step 670.

According to one aspect, if more than one group of linked logical fields can be determined for a given data abstraction model, steps 620-660 of method 600 can be repeated for each determined group. In other words, steps 620-660 form a loop which is performed for each group of linked logical fields for linking all logical fields contained in a given group.

As was noted above, the link information can be used for creating abstract queries (e.g., abstract query 202 of FIG. 2). Determination of link information and creation of abstract queries using link information is described below with reference to FIG. 7.

Creation of Abstract Queries Having Linked Logical Fields

Figure 7:
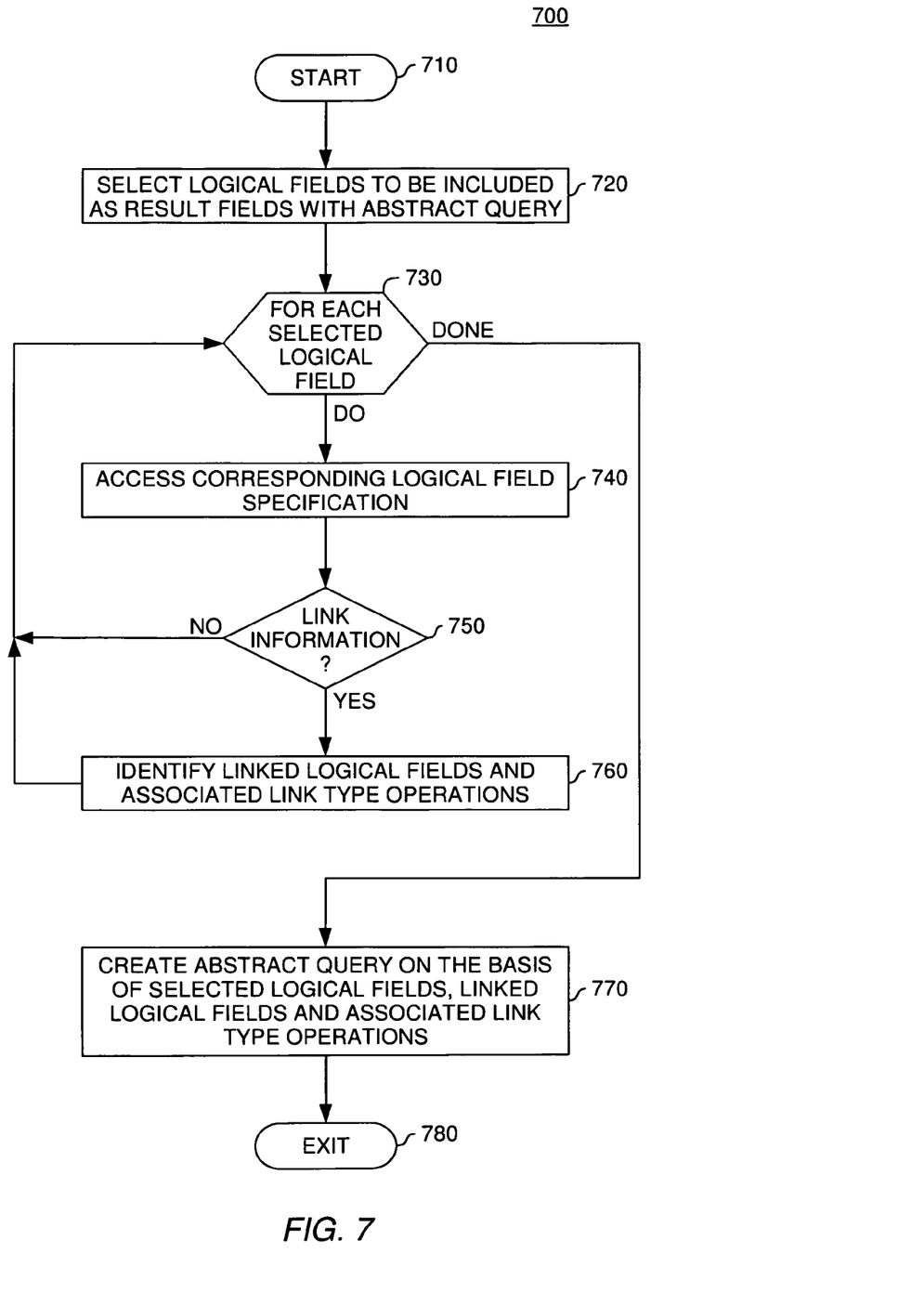
FIG. 7 is a flow chart illustrating creation of abstract queries using linked logical fields in one embodiment.

Referring now to FIG. 7, an exemplary method 700 for creating abstract queries using linked logical fields abstractly describing data in a database (e.g., database 139 of FIG. 1) is illustrated. In one embodiment, method 700 is performed by a link field manager (e.g., link field manager 150 of FIG. 1). Method 700 starts at step 710.

At step 720, one or more logical fields are selected as result fields for an abstract query. More specifically, the one or more logical fields are selected from a plurality of logical fields defining a data abstraction model (e.g., data abstraction model 132 of FIG. 2). The data abstraction model contains a logical field specification for each of the one or more selected logical fields.

Then, at step 730, a loop consisting of steps 730-760 is entered for each selected logical field. At step 740, a logical field specification corresponding to a given selected logical field, for which the loop is performed, is identified and accessed. Thus, at step 750 a verification can be performed to determine whether the logical field specification contains link information (e.g., link information 340 of FIG. 3B). If the logical field specification does not contain link information, processing returns to step 730, where the loop consisting of steps 730-760 is entered for a next one of the one or more selected logical fields. If, however, the logical field specification contains link information, the link information is accessed at step 760 to identify link definitions (e.g., link definitions 342, 344 and 346 of FIG. 3B) contained therein. Each link field definition identifies a linked logical field and an associated link type operation. Processing then returns to step 730.

When the loop consisting of steps 730-760 has been performed for all selected logical fields, processing continues at step 770. At step 770, the abstract query is created using the one or more selected logical fields and the identified linked logical fields according to the associated link type operations. More specifically, in one embodiment the one or more selected logical fields are inserted as result fields into the abstract query (e.g., the abstract query of Table I). Then, the abstract query is modified using the identified linked logical fields. The modification is performed on the basis of the associated link type operations. For instance, the identified linked logical fields are inserted into or suppressed from the abstract query. Thus, a modified abstract query (e.g., the modified abstract query of Table IV) is generated. Method 700 then exits at step 780.

Dependent on whether the abstract query or the modified abstract query is executed, different query results can be obtained. Exemplary query results are described below with reference to FIGS. 8A-C.

Figure 8A:
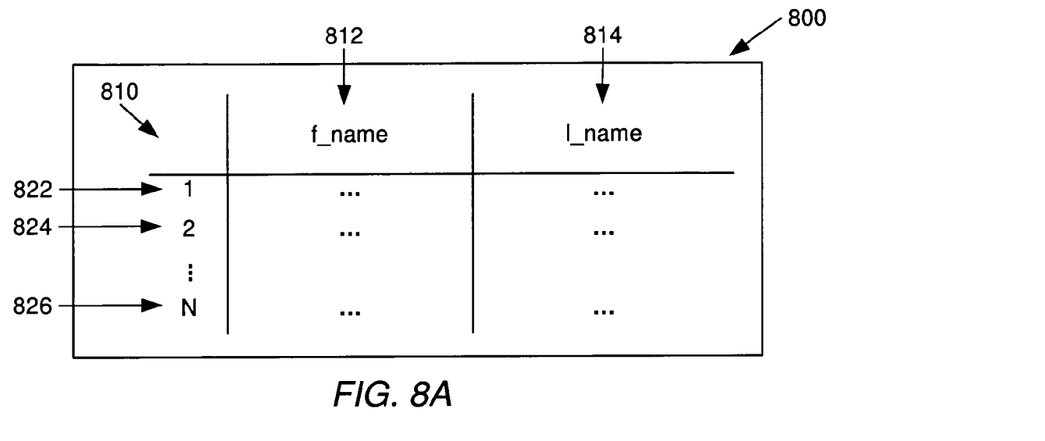
FIGS. 8A-C are screen shots illustrating interfaces displaying query results obtained upon execution of abstract queries.

Referring now to FIG. 8A, an exemplary user interface 800 displaying an illustrative query result 810 is shown. By way of example, the query result 810 can be obtained upon execution of a concrete query corresponding to the abstract query of Table I against a corresponding database (e.g., database 139 of FIG. 1).

The query result 810 is illustrated in tabular form having two columns 812 and 814 and a plurality of rows. For simplicity, only three rows 822, 824 and 826 are illustrated. The columns "f_name" 812 and "l_name" 814 correspond to the columns that can be identified in the data abstraction model of Table II (lines 006 and 016) for the result fields described in lines 010-011 of the abstract query of Table I. The rows 822, 824 and 826 illustrate data records which have been obtained as query result in response to execution of the concrete query against the corresponding database.

Figure 8B:
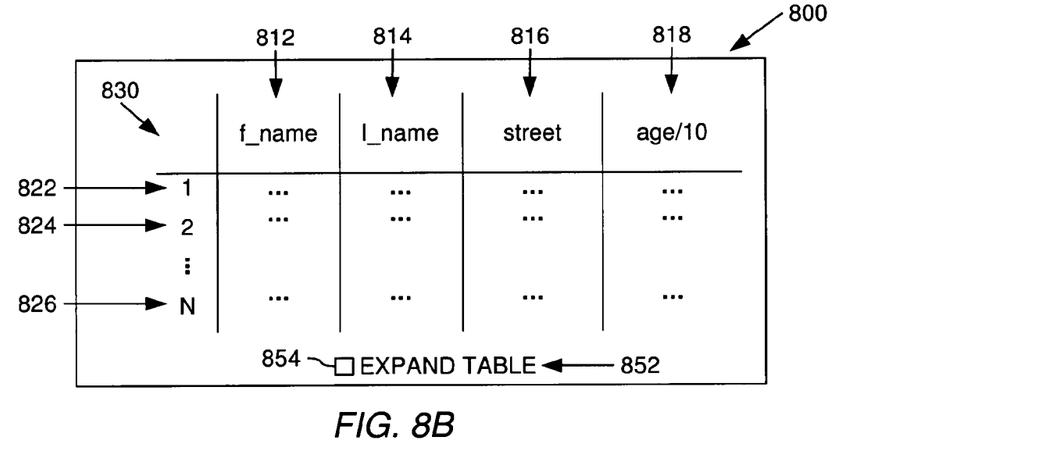

Referring now to FIG. 8B, the exemplary user interface 800 is shown displaying an illustrative query result 830. By way of example, the query result 830 can be obtained upon execution of a concrete query corresponding to the modified abstract query of Table IV against a corresponding database (e.g., database 139 of FIG. 1).

The query result 830 corresponds to the query result 810 of FIG. 8A, where additional columns 816 and 818 have been added as result of the modification of the query. More specifically, the columns "street" 816 and "age/10" 818 can be identified for the result fields described in lines 011 and 013 of the modified abstract query of Table IV. It should be noted that the expression "/10" has been added to the column 818 for clarity. Thus, the data records illustrated by rows 822, 824 and 826 in FIG. 8B include entries for the columns 812 and 814 and additional entries for the columns 816 and 818. It should further be noted that the modified abstract query of Table IV further includes a result field "AgeInYears" (line 012 of Table IV). However, display of this result field is suppressed according to the associated link type operation specified in line 012 of Table IV.

The user interface 800 of FIG. 8B further includes a graphical element that allows user selection of whether to expand display of the query result 830. In other words, the query result 830 may include columns which are hidden from display, e.g., in response to a "SuppressDisplay" link type operation. Thus, using the graphical element, the user can select display of the hidden columns. Specifically, using the graphical element, data obtained for the result field "AgeInYears" can be displayed. However, it should be noted that only a single graphical element is illustrated in FIG. 8B for brevity. In other words, a graphical element can be provided for each column that is hidden from display or for corresponding groups of columns.

Illustratively, the graphical element is shown as a checkbox 854 with a description "EXPAND TABLE" 852. Accordingly, if the user selects the checkbox using a corresponding input device, the query result 830 is expanded. Specifically, the user can use any suitable input device, such as a pointing device, including a computer mouse, a light pen, or even a human finger in the case of a touch screen. If the graphical element is selected, an expanded query result is displayed as illustrated in FIG. 8C.

Figure 8C:
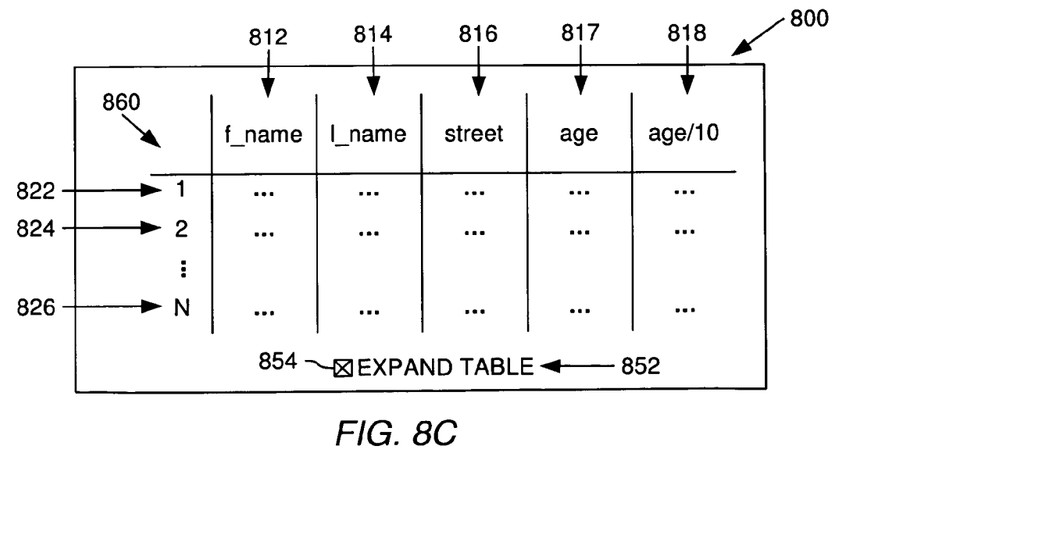

Referring now to FIG. 8C, the exemplary user interface 800 is shown displaying an illustrative expanded query result 860. The expanded query result 860 corresponds to the query result 830 of FIG. 8B, which has been expanded by adding an additional column 817. More specifically, the column "age" 817 can be identified for the result field described in line 012 of the modified abstract query of Table IV. Thus, the data records illustrated by rows 822, 824 and 826 in FIG. 8C include entries for the columns 812, 814, 816 and 818 and additional entries for the column 817.

The user interface 800 of FIG. 8C further includes the checkbox 854 of FIG. 8B, which is marked as selected for purposes of illustration to indicate that the query result 860 represents an expanded result display. In this case, if the checkbox 854 is deselected, the unexpanded query result 830 of FIG. 8B is displayed again.

In various embodiments, the invention provides numerous advantages over the prior art. For instance, according to one aspect character large object (CLOB) columns can be processed using linked logical fields. More specifically, currently CLOB columns cannot be selected as result fields for abstract queries because of various processing functions which are not configured for processing such CLOB columns. However, while it is frequently not desired to obtain CLOB column data in query results, it is often requested to obtain summary information on CLOB columns. Thus, if such summary information appears meaningful to a user, the user may subsequently access the CLOB column directly. To this end, a user may define a logical field for the CLOB column. The logical field includes link information defining that the CLOB column itself should be suppressed from an obtained query result, but that a primary key of the CLOB column should be added to the query result. Thus, the logical field can be used when specifying conditions for abstract queries with respect to a given CLOB column. Furthermore, the logical field can be specified as result field for the abstract queries.

Moreover, in one embodiment an additional functionality can be provided using linked logical fields, which cannot be accounted for in a declarative manner otherwise. For instance, suppression of display output can be declared. This allows a column to be included in the query result, but not to be displayed by default. It should be noted that this is one example and that other declarative output functionality can also be implemented.

Furthermore, it should be noted that linked logical fields can cascade. For example, a given linked logical field can be linked to another logical field. Thus, inserting the given linked logical field into an abstract query would lead to inserting the other logical field as well. More specifically, assume a specific logical field related to a particular quality control which in turn requires a specific parameter from another quality control field, such as a normalized weight field, for providing a meaningful quality control result. Therefore, according to one aspect both fields are inserted into a corresponding query. Consequently, this provides a means by which result fields in an abstract query can have functions applied thereto. For example, assume an abstract query that returns a Hemoglobin Test field which is a float in some types of queries. However, as floats may not print in a desired format for common report generation, a user may create an abstract query that is suitable to transform the output for the Hemoglobin Test field from a 'Float' format into a 'Formatted Float' format. The abstract query can be modified to remove the float field and to add a composed field that is a formatted float field, such as a NUMERIC(float field, 9, 3).

It should be noted that any reference herein to particular values, definitions, programming languages and examples is merely for purposes of illustration. Accordingly, the invention is not limited by any particular illustrations and examples. Furthermore, while the foregoing is directed to embodiments of the present invention, other and further embodiments of the invention may be devised without departing from the basic scope thereof, and the scope thereof is determined by the claims that follow.

What is claimed is:

1. A method of linking logical fields abstractly describing data in a database, the method comprising:
    creating link information for a first logical field from the plurality of logical fields, wherein data in the link information is defined by a link data structure that includes at least one second logical field from the plurality of logical fields and an associated link type operation, wherein the first logical field and the second logical field are associated with different physical fields in the database, the link data structure is independent of a data structure that defines the first logical field, wherein the associated link type operation includes an attribute to suppress a display of a value of the second logical field when results of a query based on the link information are displayed; and linking the first and second logical fields using the link information, wherein the data included in the link information is stored independent from the first logical field.

2. The method of claim 1, further comprising:

determining one or more groups of linked logical fields from the plurality of logical fields, at least one group including the first logical field and the at least one second logical field.

3. The method of claim 1, wherein each logical field of the plurality of logical fields is described by a corresponding logical field specification, the method further comprising:

including the link information with a logical field specification corresponding to the first logical field.

4. The method of claim 1, wherein the link information defines an operation to be performed on the at least one second logical field in response to selection of the first logical field as result field for an abstract query.

5. The method of claim 4, wherein the associated link type operation further includes one of an (i) insert and (ii) suppress.

6. A system, comprising:

a processor;

a plurality of logical fields abstractly describing data in a database; and a link field manager which, when executed by the processor, is configured to:

create link information for a first logical field from the plurality of logical fields, wherein data in the link information is defined by a link data structure that includes at least one second logical field from the plurality of logical fields and an associated link type operation, wherein the first logical field and the second logical field are associated with different physical fields in the database, the link data structure is independent of a data structure that defines the first logical field, wherein the associated link type operation includes an attribute to suppress a display of a value of the second logical field when results of a query based on the link information are displayed; and link the first and second logical fields using the link information, wherein the data included in the link information is stored independent from the first logical field.

7. A method of linking logical fields abstractly describing data in a database, the method comprising:

creating link information for a first logical field from the plurality of logical fields, the link information identifying at least one second logical field from the plurality of logical fields and an associated link type operation, the associated link type operation includes one of insert, suppress and suppress display operation; and linking the first and second logical fields using the link information.

8. The method of claim 7, wherein each logical field of the plurality of logical fields is described by a corresponding logical field specification.

9. The method of claim 8, further comprising including the link information with a logical field specification corresponding to the first logical field.

* * * * *